United States Patent [19]

Davis, Jr. et al.

[11] 4,344,146
[45] Aug. 10, 1982

[54] VIDEO INSPECTION SYSTEM

[75] Inventors: Ray E. Davis, Jr., Old Lyme; Richard J. Becker, Madison; Robert G. Foster, Clinton; Michael J. Westkamper, Oakdale; Earle J. Timothy, Clinton; Richard H. Johnson, Ivoryton, all of Conn.

[73] Assignee: Chesebrough-Pond's Inc., Greenwich, Conn.

[21] Appl. No.: 148,451

[22] Filed: May 8, 1980

[51] Int. Cl.³ .................... H02N 7/02; G06F 15/20
[52] U.S. Cl. .................... 364/552; 364/515
[58] Field of Search ........... 364/514, 515, 521, 468, 364/200, 552; 358/101, 106, 107

[56] References Cited

U.S. PATENT DOCUMENTS

| | | | |
|---|---|---|---|
| 3,243,509 | 3/1966 | Stut | 358/107 |
| 3,868,508 | 2/1975 | Lloyd | 358/101 X |
| 3,986,000 | 10/1976 | McJohnson | 364/514 X |
| 4,026,555 | 5/1977 | Kirschner et al. | 358/903 X |
| 4,041,286 | 8/1977 | Sanford | 358/903 |
| 4,064,534 | 12/1977 | Chen et al. | 358/107 |
| 4,078,253 | 3/1978 | Kajiura et al. | 364/515 X |
| 4,135,204 | 1/1979 | Davis, Jr. et al. | 358/101 |
| 4,181,952 | 1/1980 | Casey et al. | 364/515 |
| 4,212,031 | 7/1980 | Schmitt et al. | 358/101 |
| 4,224,600 | 9/1980 | Sellner | 364/515 X |
| 4,232,336 | 11/1980 | Henry | 358/903 X |
| 4,238,768 | 12/1980 | Mitsuya et al. | 364/515 X |
| 4,245,243 | 1/1981 | Gutjahr et al. | 358/106 |
| 4,261,018 | 4/1981 | Knowlton | 364/515 X |

Primary Examiner—Edward J. Wise

[57] ABSTRACT

A video inspection system comprising a TV camera for producing a digital video image of a subject, an interface, having a direct memory access channel, for structuring the digital data, a high speed random access memory for storing the digital data, a bus oriented processor for performing high speed processing of the digital data in the memory, a digital computer for controlling the operation of the system and an operator terminal for communicating with the system.

61 Claims, 18 Drawing Figures

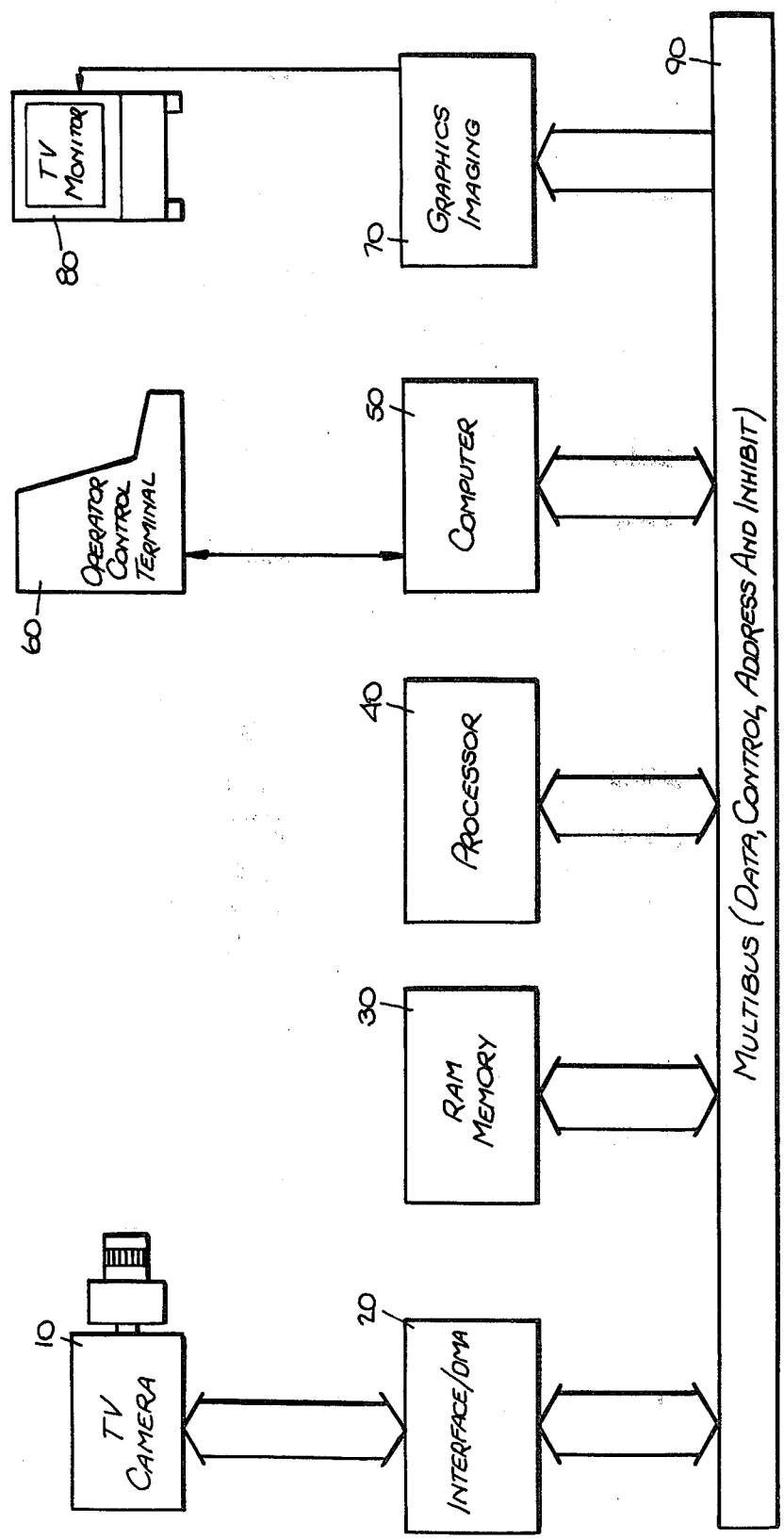

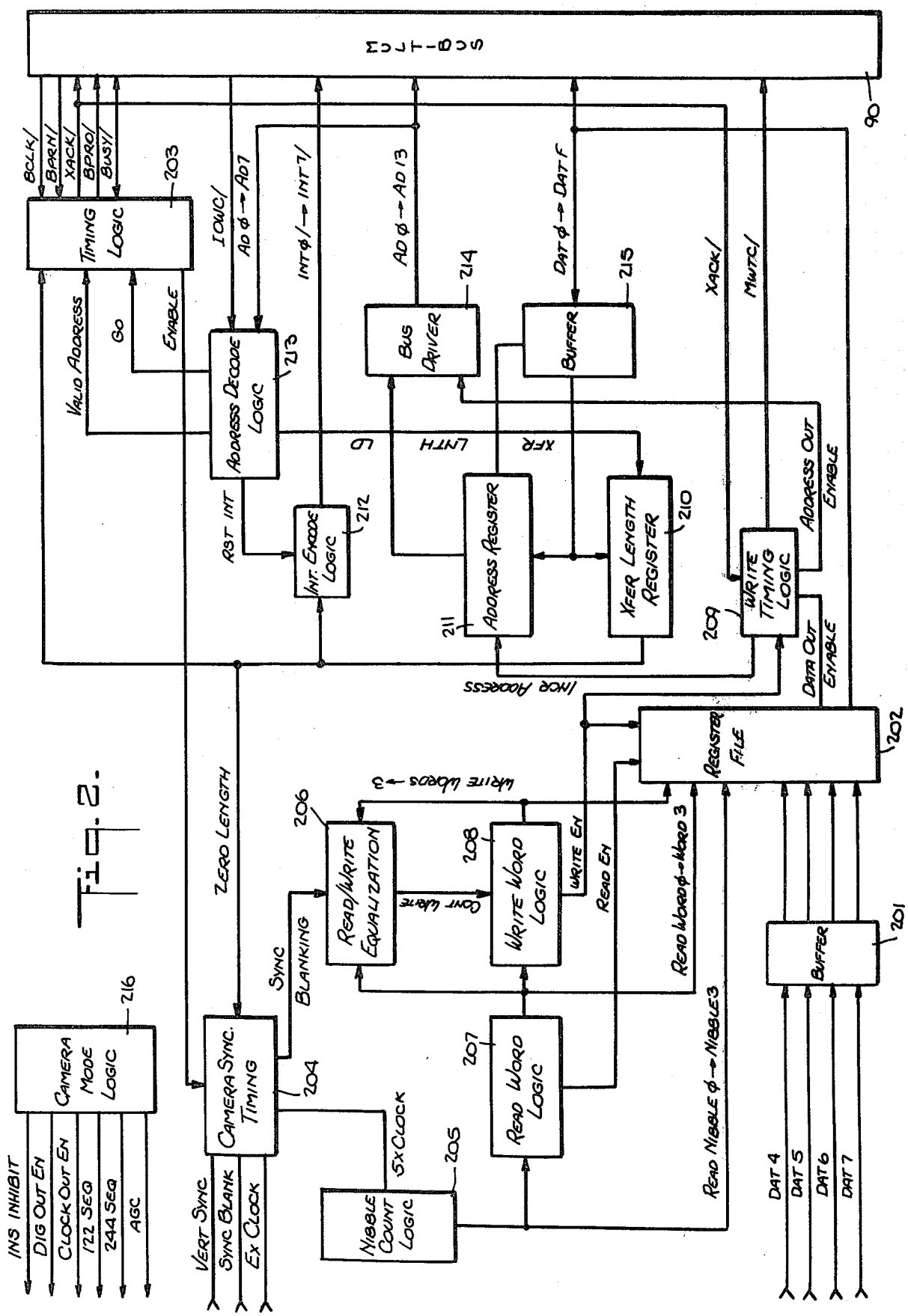

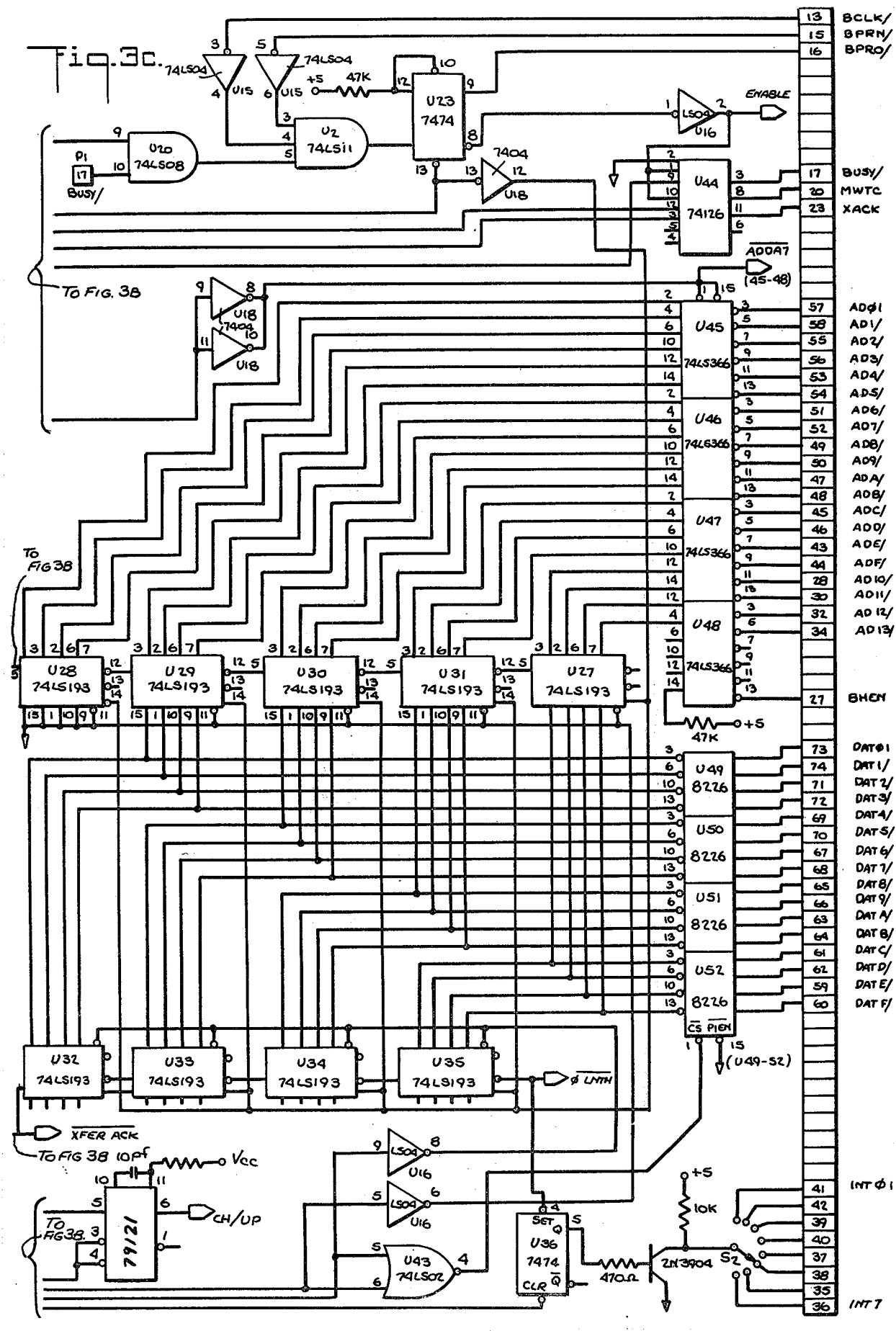

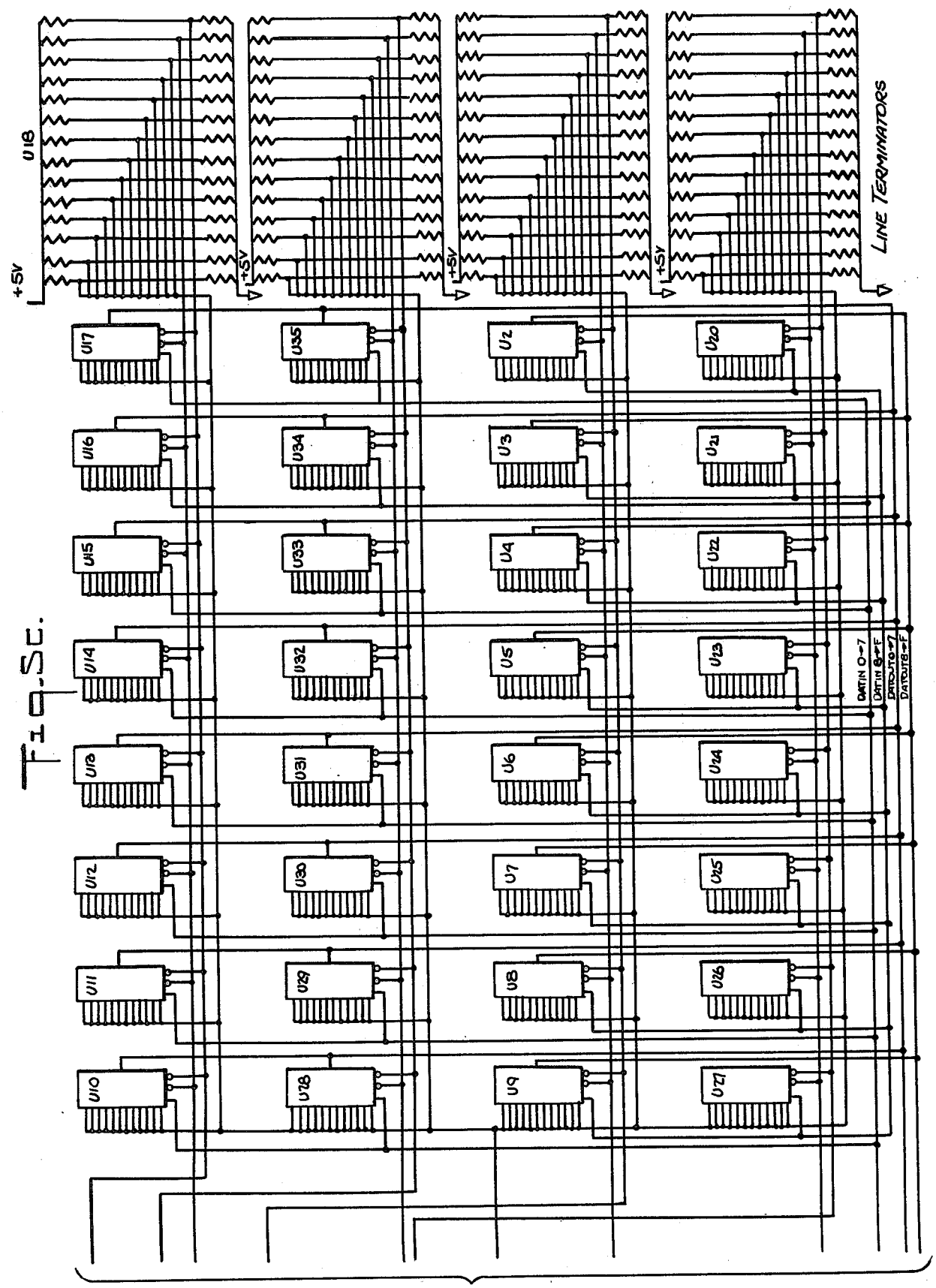

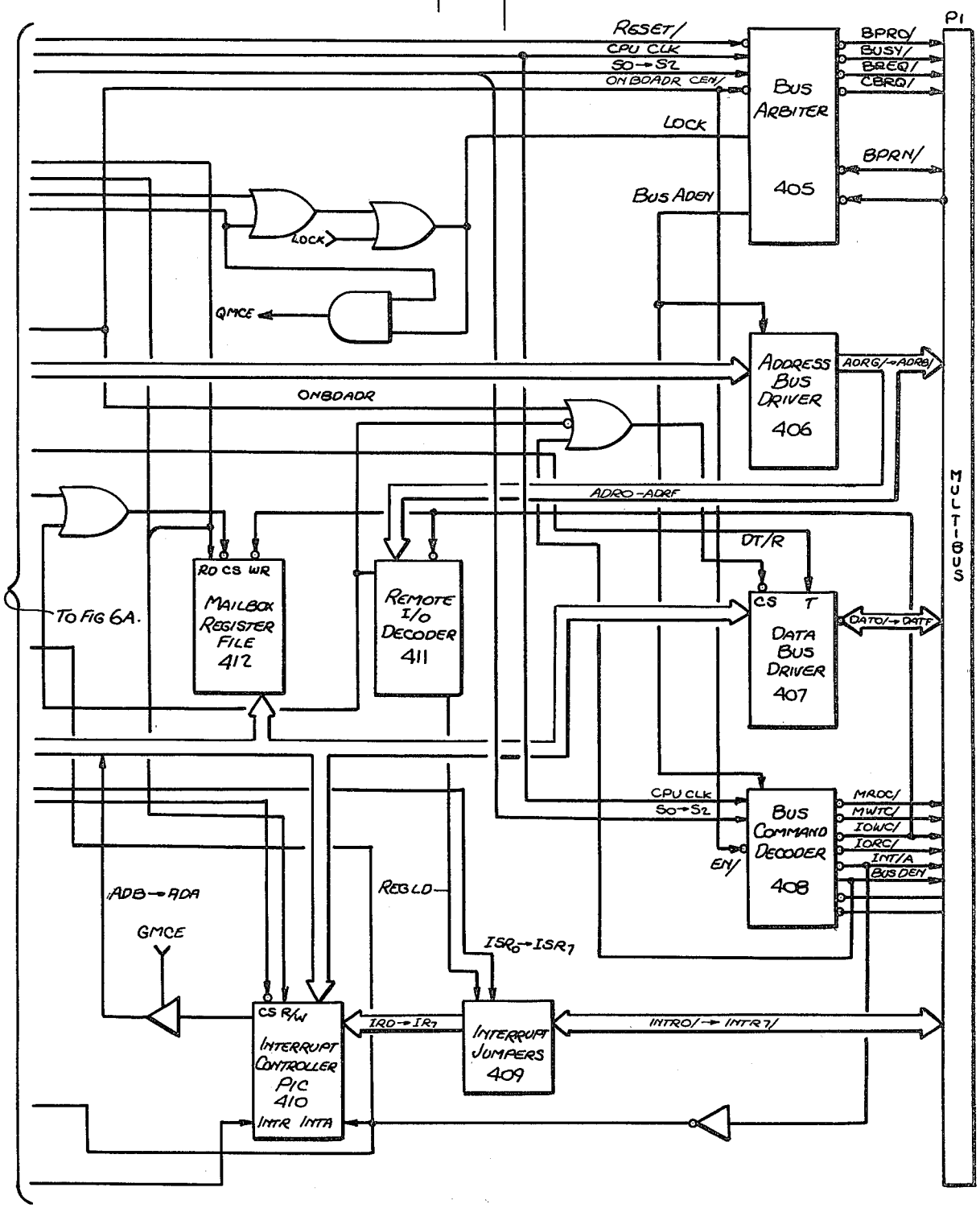

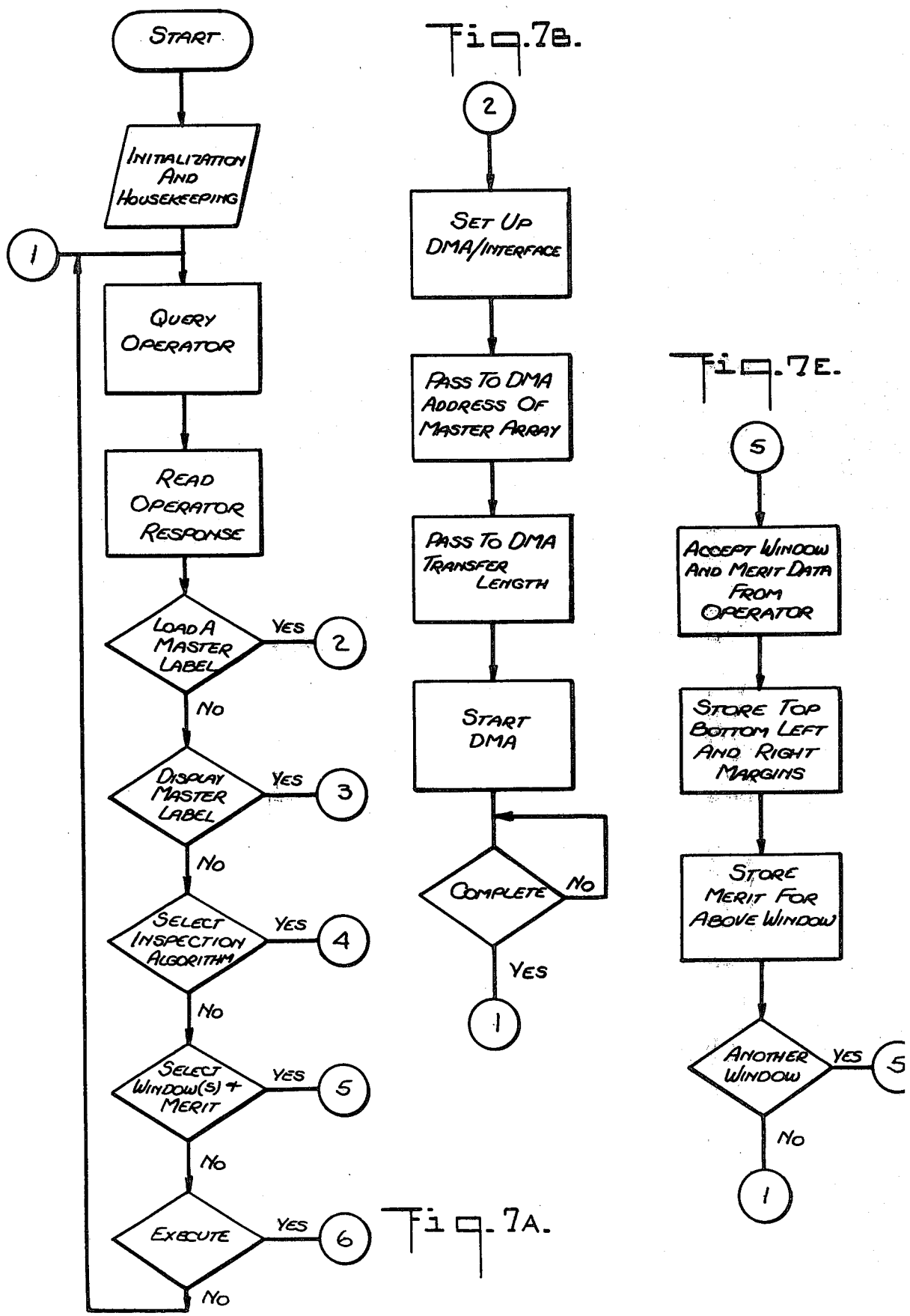

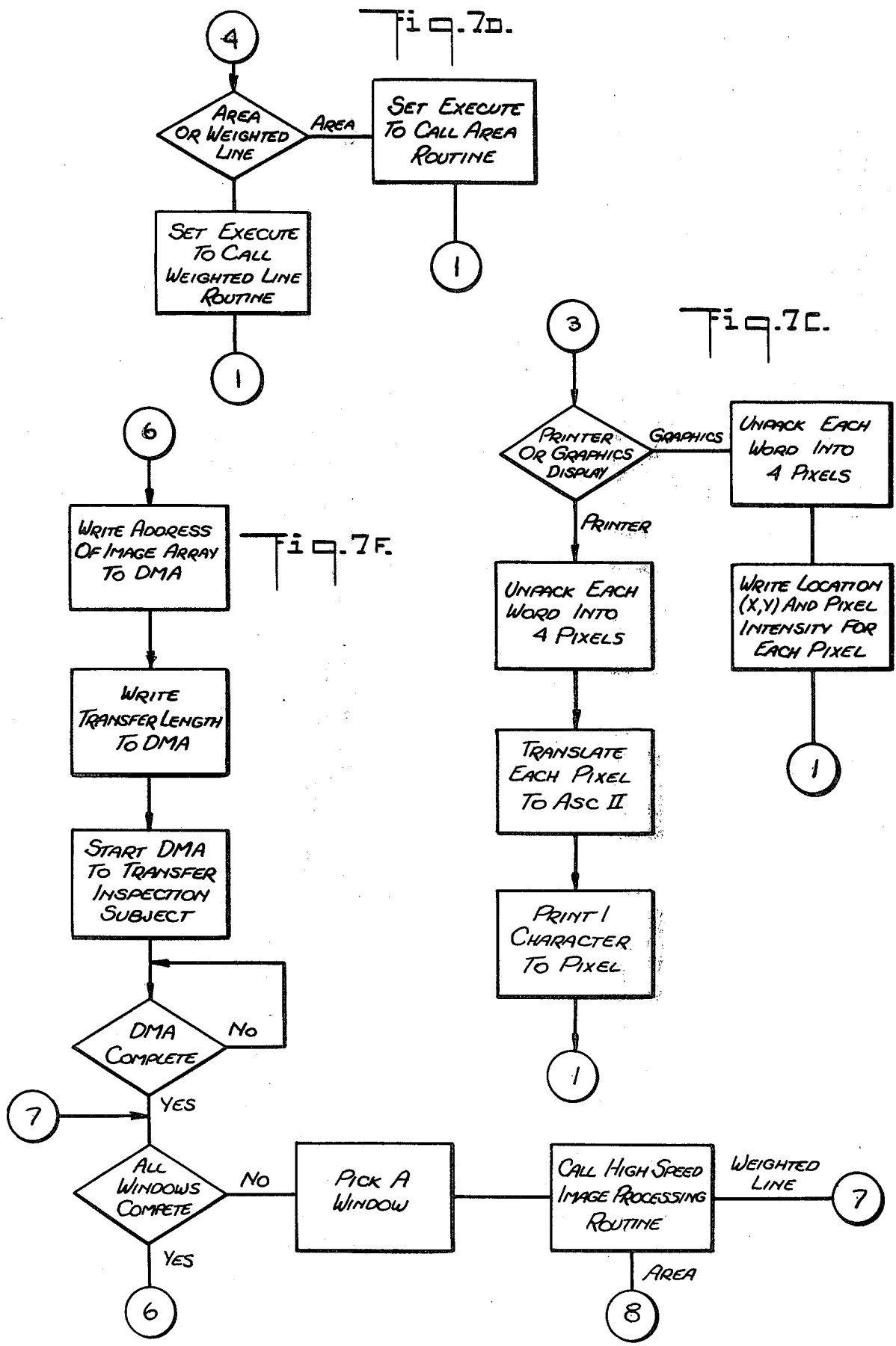

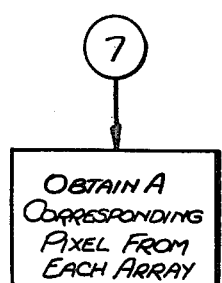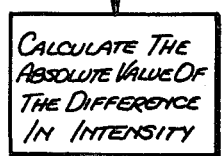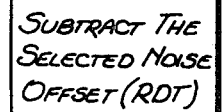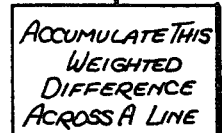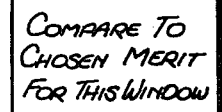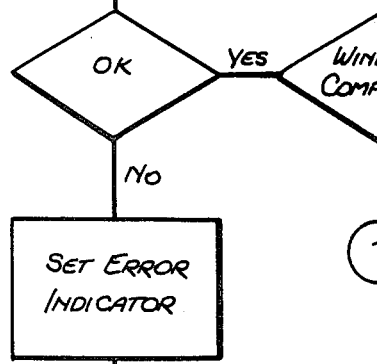
Fig. 7G.
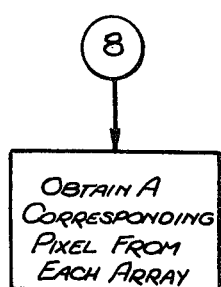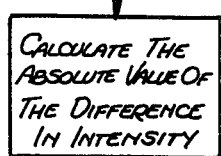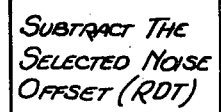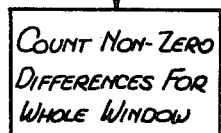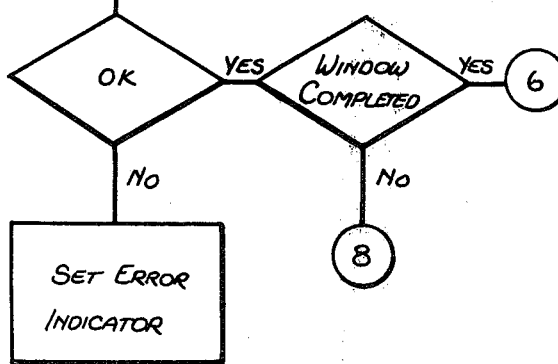
Fig. 7H.

VIDEO INSPECTION SYSTEM

BACKGROUND AND BRIEF DESCRIPTION OF THE INVENTION

The present invention relates to a video inspection system and, more particularly, to a real time video inspection system having sixteen levels of grey shade resolution.

It is known to employ closed circuit television for process control. For example, U.S. Pat. No. 3,243,509 to Hans Sut discloses a system which employs a TV camera to detect the phase boundary between the solid and liquid phases of a semiconductor rod in a zone melting process. In U.S. Pat. No. 4,064,534 to Tung Chang Chen et al a TV camera is employed as part of a quality control system in the manufacture of glass bottles, the outline of the finished bottle being compared with that of a reference bottle. In U.S. Pat. No. 4,135,204 to Ray E. Davis, Jr. et al, which is assigned to the assignee of the present invention, a TV camera is used to control the growth of a thermometer end opening blister in a heated hollow glass rod by monitoring and iteratively controlling the growth of the edges of the blister using edge detection techniques.

These prior art systems are directed to situations where the parameter of interest is an edge or boundary which may be compared with a pre-existing reference. There are many applications, however, where edge or boundary detection is totally inadequate. These applications include, for example, pattern recognition and area measurement.

The present invention overcomes the limitations of the prior art systems and comprises a high speed, real time video inspection system having sixteen levels of grey shade resolution which is suitable for both pattern recognition and area measurement applications. The video inspection system of the present invention is small, powerful, fast, relatively inexpensive and very reliable.

In an illustrative embodiment the present invention is employed in a quality control application to compare labels on bottles coming off a high speed fill line with a reference label to determine whether the bottles bear the correct labels and whether the copy on the labels has been smudged or otherwise damaged. In a preferred mode of operation the difference, if any, between the reference label and the label being inspected is displayed on a TV monitor for viewing by an operator. The advantages of this application are readily apparent since now it is possible to have 100% quality control inspection without incurring large labor expenditures.

In a preferred embodiment the present invention employs a solid state TV camera utilizing, for example, a 244 by 236 array of elements, each of the 57,584 elements constituting a "pixel" or elemental part of the overall picture. The unstructured digital data from the TV camera goes to an interface which has a direct memory access (DMA) channel. The interface/DMA takes the real time video information and structures the data, using sixteen grey shade levels, and combines four "pixels" into each word. In addition to the TV camera and interface/DMA, the present invention employs a RAM memory, a processor, a computer (with an associated operator control terminal) and graphics imaging circuitry (with an associated TV monitor). The interface/DMA, RAM memory, processor, computer and graphics imaging circuitry are all interconnected by means of a "multibus" which carries data, control and address signals. The interface/DMA synchronizes the TV camera with the multibus and transfers the TV image in real time to any desired location in the RAM memory. Once the image is in the RAM memory, processing occurs on two levels. The computer provides the supervisory tasks for serial communication, memory management input/output processing, data acquisition and display whereas the processor is used for high speed array processing of the data in the RAM memory. The system software is located in the computer.

As already noted, the video inspection system of the present invention is readily adaptable to numerous applications involving pattern recognition and area measurement. Applications involving pattern recognition include the inspection of completed printed circuit boards, the detection of flaws in manufactured items, intruder detection, the analysis of fingerprints, the detection of foreign objects in containers before they are filled and as part of aircraft landing or collision avoidance systems. Applications involving area measurement include the measurement of machined parts, the measurement of heart wall thickness, the semi-automated analysis of X-rays and the precision area measurement of iregular objects. With the addition of positioning information, the video inspection system of the present invention can also be used to generate visual sensory signals for robotics.

The video inspection system of the present invention is so versatile because it can acquire and process the full range of data available from the sensor. Moreover, by using standard optical components with the TV camera the images available for analysis extend from the micro scale to the macro scale, from images of microelectronic circuitry to images of planetary bodies or star fields. In addition, standard optical filtering techniques may also be employed to enhance or otherwise alter the frequency response of the system and to develop, for example, specific color sensitivities.

Since the solid state TV camera is sensitive to the entire visible spectra and beyond, the video inspection system of the present invention may be applied to any task where the visible spectrum is involved. For example, secondary emissions of X-rays via fluoroscopy may be analyzed. Spectral analysis and colorimetry are also possible. Photographs of events can also be analyzed in a variety of ways. In short, the applications for the video inspection system of the present invention are limited only by the resolution of the sensor and the ability to develop appropriate image processing software.

BRIEF DESCRIPTION OF THE DRAWINGS

The present invention is described with reference to the following drawings which form a part of the specification and wherein:

FIG. 1 is a functional block diagram of a preferred embodiment of the video inspection system of the present invention;

FIG. 2 is a functional block diagram of the interface/DMA of FIG. 1;

FIGS. 3A through 3C comprise a schematic diagram of the interface/DMA of FIG. 2;

FIGS. 5A through 5C comprise a schematic diagram of one "page" of the memory of FIG. 4;

FIGS. 6A and 6B comprise a functional block diagram of the processor of FIG. 1; and FIGS. 7A through 7H comprise program flow diagrams for the embodiment of FIG. 1.

DETAILED DESCRIPTION

Figure 3A:
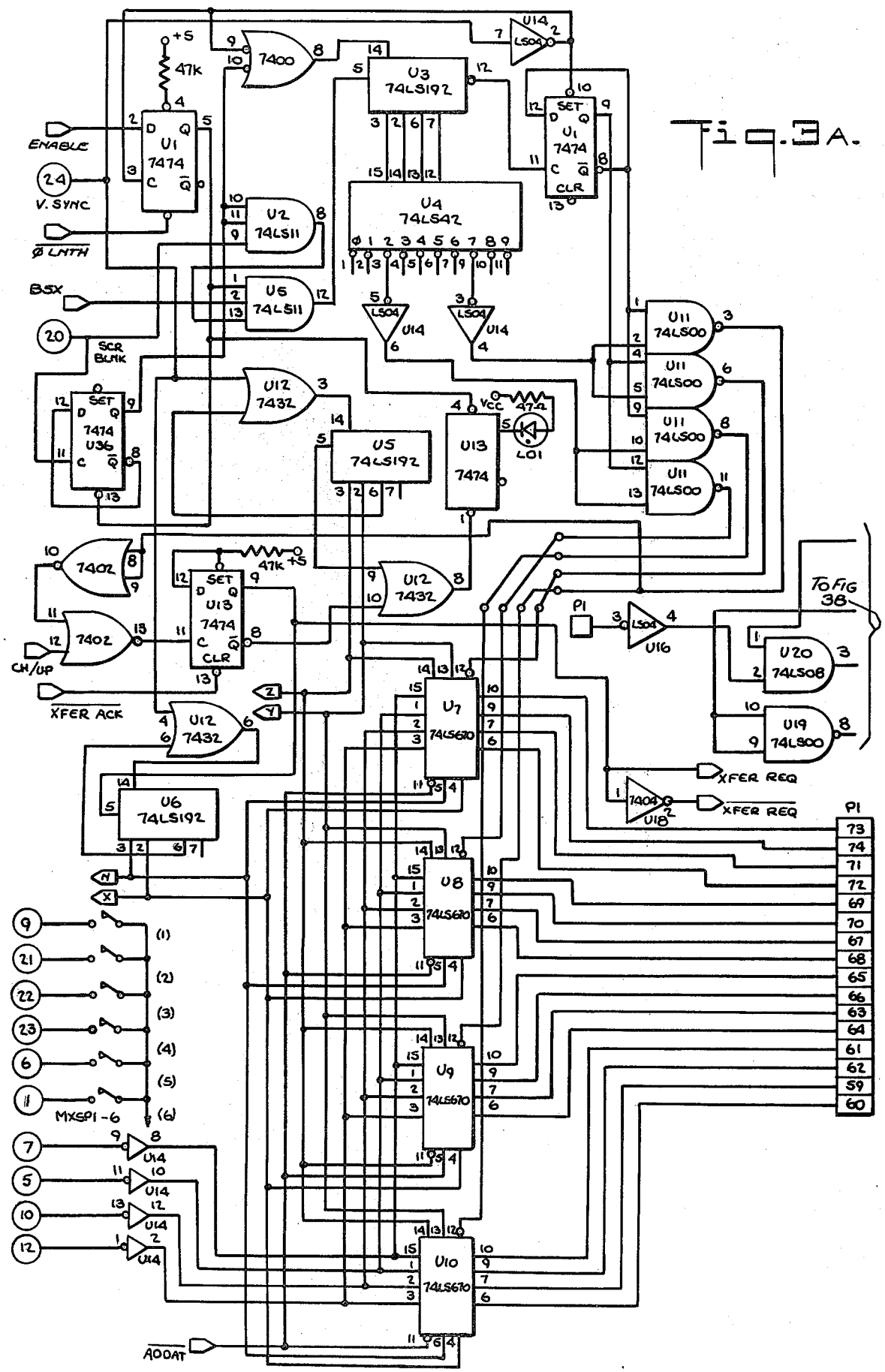

The video inspection system of the present invention is shown in FIG. 1 and comprises a T.V. camera 10, an interface/DMA 20, a RAM memory 30, a processor 40, a computer 50, an operator control terminal 60, graphics imaging circuitry 70 and a T.V. monitor 80. The interface/DMA, RAM memory, processor, computer and graphics imaging circuitry are all linked by multibus 90.

T.V. camera 10 is preferably a solid state camera such as the General Electric Co. TN2500 CID (charge injection device) which has a planar, two axis array of image elements comprising 244 vertical elements by 248 horizontal elements. In the preferred embodiment only 236 of the 248 rows are used. This produces 57,584 picture elements or "pixels" per frame, each "pixel" measuring 36×46 micrometers. Full frame readout takes 30 milliseconds and each pixel has sixteen levels of grey shade resolution (which requires 4 bits). Thus, digital data is produced by the T.V. camera at a rate of $$\frac{57{,}584 \text{ pixels}}{30 \text{ milliseconds}} \times \frac{4 \text{ bits}}{\text{pixel}} = 7.68 \text{ megabits/sec.}$$

Figure 3B:
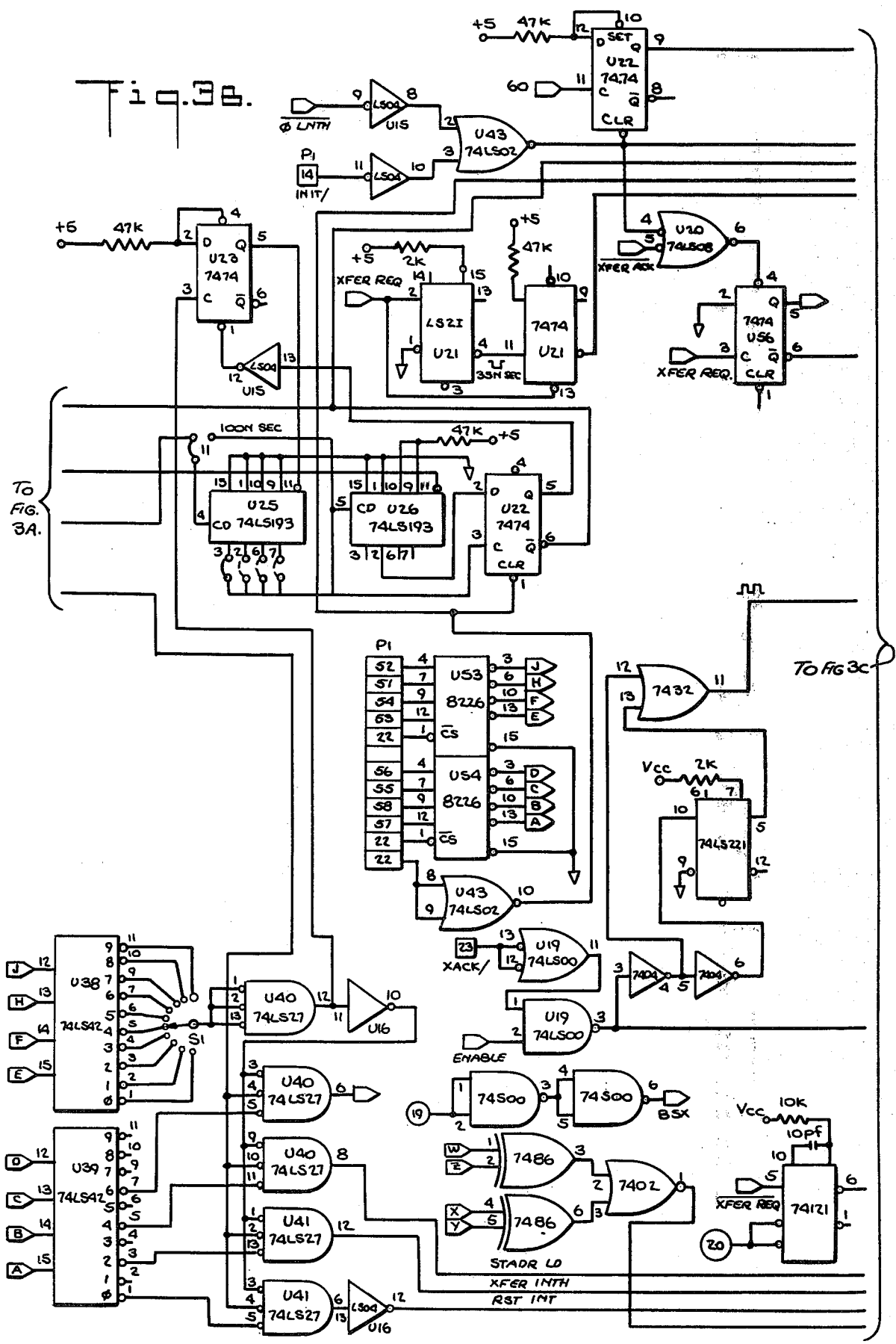

Interface/DMA 20 is shown in FIG. 2 in the form of a functional block diagram and is shown schematically in FIG. 3. Interface/DMA performs two separate functions. it accumulates four 4-bit pixels into one 16-bit (2 byte) word and performs the direct memory address to RAM memory 30. It also performs all the synchronization between the video data and multibus 90. Interface/DMA 20 is capable of addressing up to 1 megabyte of storage, transferring up to 128 thousand bytes in a single transfer burst, and can operate at up to 10 megabyte per second transfer rates. The minimum transfer rate is 2 megabytes per second. Thus, interface/DMA 20 is able to process the full resolution and sensitivity of the sensor.

Figure 4:
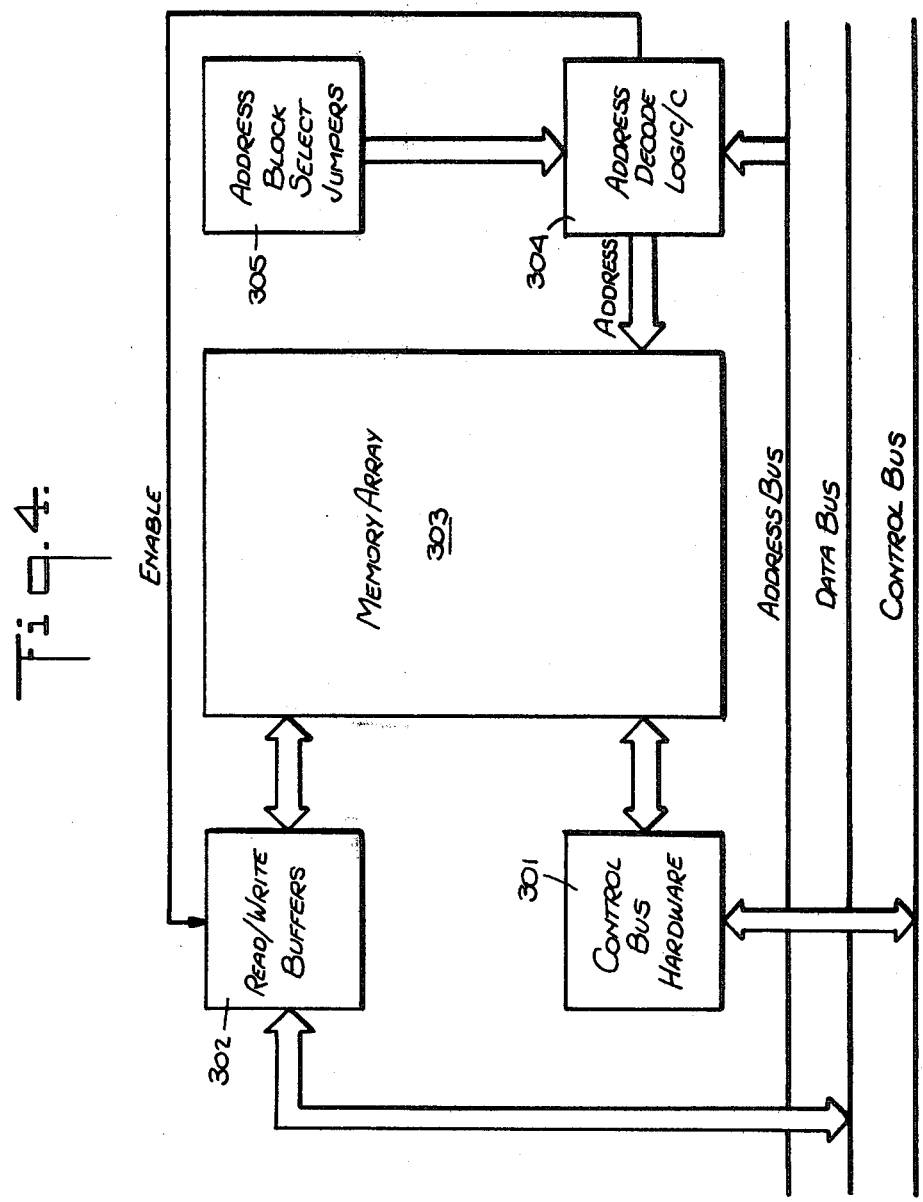
FIG. 4 is a functional block diagram of the RAM memory of FIG. 1.
Figure 5A:
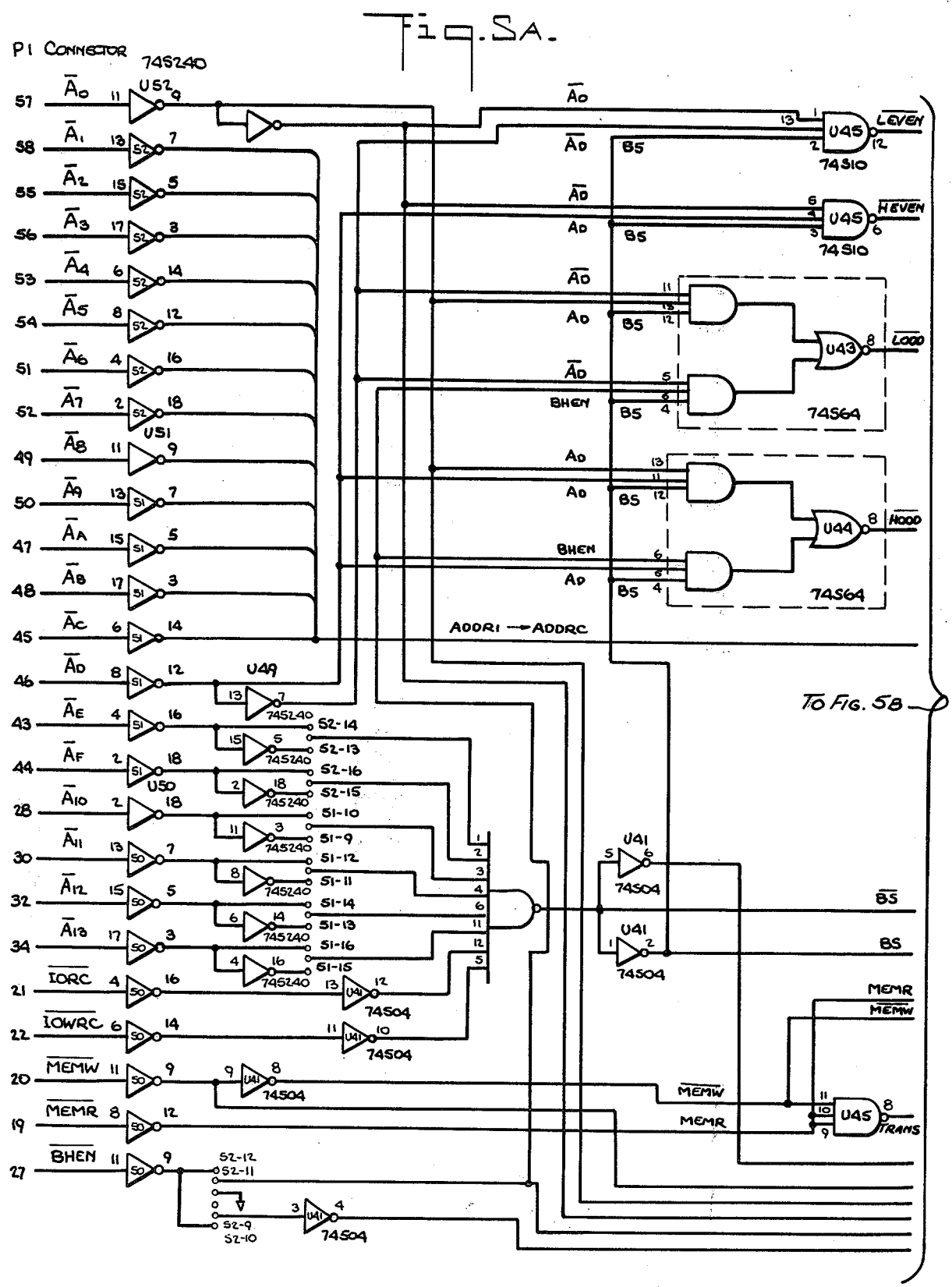
Figure 5B:
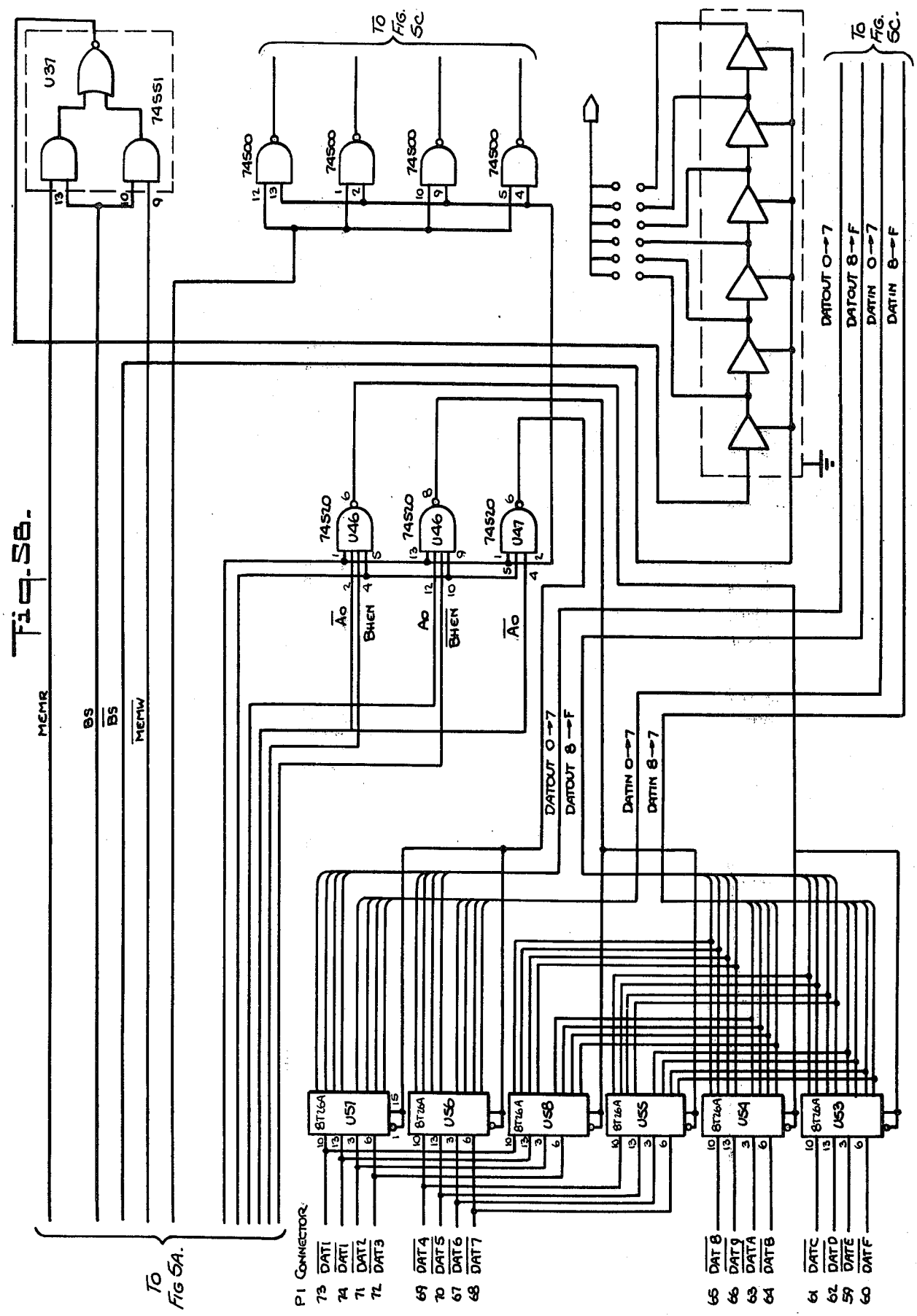

High speed static RAM memory 30 is shown in functional block diagram form in FIG. 4 and schematically in FIG. 5. RAM memory 30 has a one megabyte address space so that it can receive in real time the full output from TV camera 10. RAM memory 30 has a worst case storage cycle time of 100 nanoseconds and is able to read/write either 8 or 16 bits per cycle anywhere in the one megabyte address space.

Figure 6A:
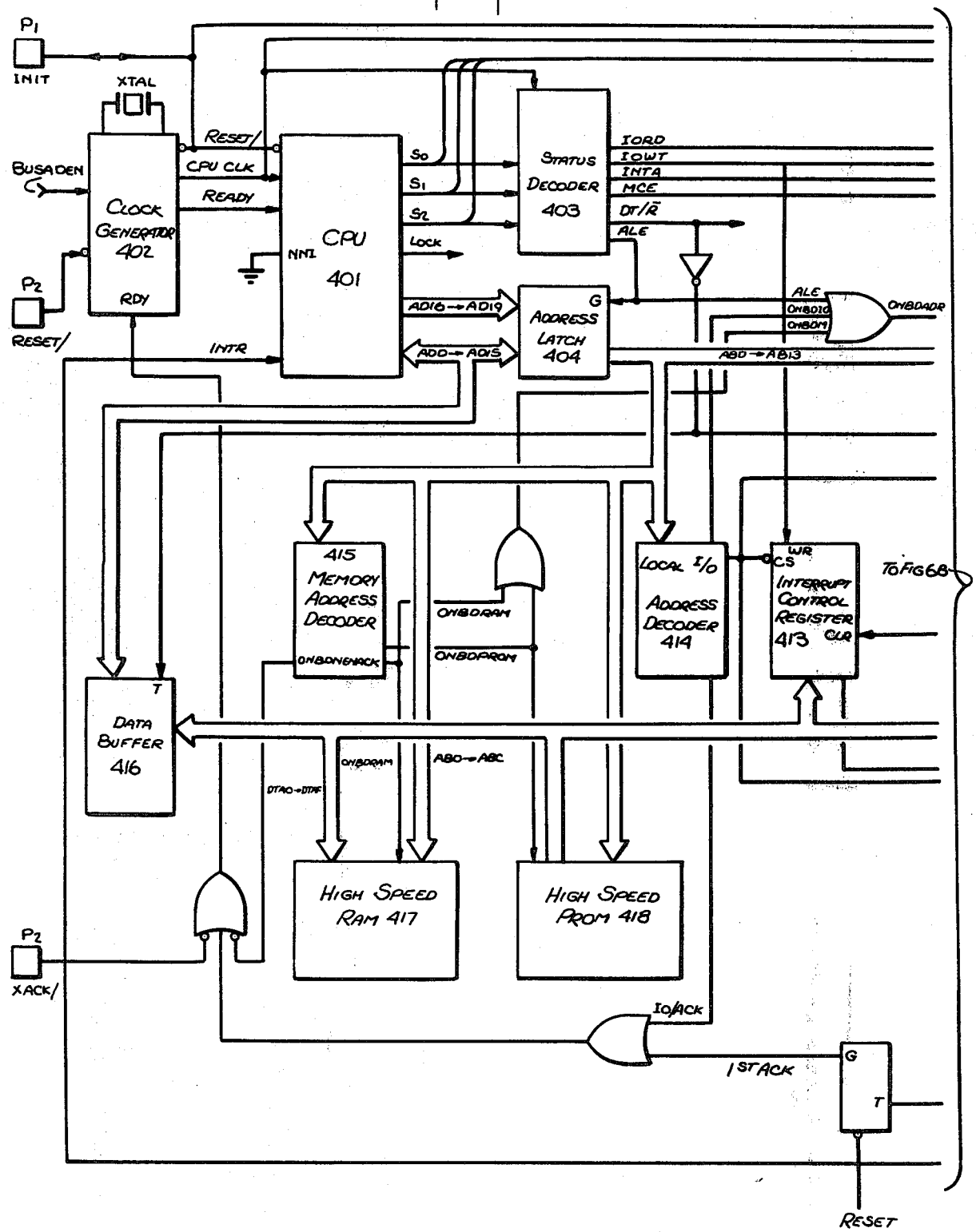

High performance bus oriented processor 40 is shown in functional block diagram form in FIG. 6 and schematically in FIG. 7. Processor 40 is designed to access program code and data from multibus 90 and execute the program at an eight to ten megahertz clock rate. Processor 40 performs high speed computation on the data in memory 30.

System computer 50 may be an Intel SBC 86/12 microcomputer which is based on the Intel 8086 16-bit microprocessor. Once the image has been stored in memory 30, the bulk of the processing is carried out with computer 50. As noted earlier, computer 50 provides the supervisory tasks for serial communication, memory management input/output processing, data acquisition and display. Resident in computer 50 are those program codes necessary to perform a variety of video processing functions including pattern recognition and non-contact measurement. The software is stored in EPROM's forming a part of computer 50. FIGS. 7A through 7H comprise program flow charts for an application of the video inspection system of the present invention involving label inspection.

Operator control terminal 60 is shown in FIG. 1 and permits the operator to communicate with computer 50. Operator control terminal 60 may be any standard RS232C terminal such as a Data General Dasher terminal. Operator control terminal 60 comprises a keyboard and a CRT or a keyboard printer. Operator control terminal 60 communicates with computer 50 and permits, for example, parametric changes to be made to the software.

Graphics imaging circuitry 70 interfaces with multibus 90 and puts data into a format suitable for display on TV monitor 80. In the preferred embodiment, graphics imaging circuitry 70 produces a composite video grey scale output. Graphics imaging circuitry 70 may be a model RGB-256 single board 16 color/grey CRT controller manufactured by Matrox Electronic Systems, Ltd., Montreal, Quebec, Canada. The RGB-256 graphics imaging circuitry is compatible with the standard Intel SBC bus system. T.V. monitor 80 may be any standard television monitor.

Multibus 90 interfaces with various bus elements, i.e., masters, slaves and intelligent-slaves. A bus master is any module which has the ability to control the bus. The master exercises this control by acquiring the bus through bus exchange logic and then generating command signals, address signals and memory addresses. Many modules may be bus masters. The most basic type of bus master includes the Intel MD-800 CPU module which includes a processor and bus exchange logic. More complex masters include the Intel SBC 80/20, the Intel SBC 80/30 and the Intel 86/12 microcomputers.

Another type of module which can interface to the multibus is the bus slave. Bus slaves decode the address lines and act upon the command signals from the bus masters. The bus slaves are incapable of controlling the multibus. Examples of bus slaves include input/output registers and memories.

The third type of module that can interface to the multibus is the intelligent slave. The intelligent slave has all the attributes of a slave module in that it decodes addresses and acts upon commands from master modules. However, the intelligent slave contains a microprocessor which is programmed with software or firmware and is used to control the on-board memory and the input/output but not the multibus.

In terms of bus elements, interface/DMA 20, RAM memory 30 and graphics imaging circuitry 70 are slave modules whereas processor 40 is an intelligent slave module and computer 50 is a master module.

As shown in FIG. 1, the signals on multibus 90 comprise data lines, control lines and address and inhibit lines. The data lines comprise sixteen bidirectional data lines, DATO/ through DATF/ in hexadecimal notation. The control lines comprise clocks, commands, acknowledge and initialize. The clocks are "constant clock" (CCLK/) and "bus clock" (BCLK/). The commands comprise "memory write" (MWTC/), "memory read" (MRDC/), "input/output write" (IOWC/) and "input/output read" (IORC/). The acknowledge command is "transfer acknowledge" (XACK/) while the initialize command is "initialize" (INIT/). The address lines comprise ADR0/ through ADR13/ (0-9, A-F, 10-13) while the inhibit lines comprise INH1/ and INH2/. Byte control is BHEN/.

Referring to FIG. 2, all DMA control words are accepted on the trailing edge of CCLK/. Commands are implemented or data loaded 30 nanoseconds after address recognition. Start DMA is implemented on the next leading edge of BCLK/. An XACK/ is generated by the DMA four CCLK/ pulses following address recognition.

T.V. camera 10 can be operated in either the "122 sequential" mode or the "244 sequential" mode. In the "122 sequential" mode only 122 lines of 236 "pixels" each is utilized. In the "244 sequential" mode, which is the highest resolution mode of the camera, 244 lines of 236 "pixels" each are employed. The mode of camera operation is indicated by an appropriate output from camera mode logic 216. In the preferred embodiment the "244 sequential" mode is employed.

Interface/DMA utilizes three timing signals from the camera. These are vertical sync, sync blanking and 5x clock. These three signals are shown in FIG. 2 as inputs to camera sync timing 204. Sync blanking is a logic signal which goes high when valid data is presented at DAT 4 through DAT 7. The vertical sync pulse occurs at the beginning of each data field, two fields forming one frame. In the "244 sequential" mode the vertical sync pulse occurs every 33.32 milliseconds. The 5x clock is 22.5 megahertz and a new 4-bit "pixel" is presented on lines DAT 4 through DAT 7 every 5 clock pulses (every 222 nanoseconds). Thus, a 16 bit (2 byte) word is transferred every 888 nanoseconds and there are 62 word transfers per line.

Interface/DMA 20 is shown in FIG. 2 in functional block diagram form as comprising input buffer 201, register file 202, timing logic 203, camera sync timing 204, nibble count logic 205, read/write equalization 206, read word logic 207, write word logic 208, write timing logic 209, transfer length register 210, address register 211, interrupt encode logic 212, address decode logic 213, bus driver 214, output buffer 215 and camera mode logic 216. Interface/DMA 20 is also shown schematically in FIG. 3. Although unnecessary for a full understanding of the present invention, the relationship between the functional block diagram of FIG. 2 and the schematic diagram of FIG. 3 is set forth below. It will be understood by those skilled in the art that since interface/DMA is constructed from multifunctional integrated circuit "chips," each of which may contain a number of separate circuits, a given "chip" in FIG. 3 may form part of several different functional blocks in FIG. 2.

Buffer 201 comprises U14 and U15. Register file 202 comprises U7 through U10. Timing logic 203 comprises U2, U20 and U22. Camera sync timing 204 comprises U1 and U2. Nibble count logic 205 comprises U1, U3, U4 and U11. Read/write equalization 206 comprises U5, U6 and U70 through U72. Read word logic 207 comprises U5 whereas write word logic 208 comprises U6. Write timing logic 209 comprises U13, U18 through U21, U55, U56 and U100. Transfer length register 210 comprises U32 through U35. Address register 211 comprises U27 through U31. Interrupt encode logic 212 comprises U41 and U16. Address decode logic 213 comprises U38 through U41, U53 and U54. Address bus driver 214 comprises U45 through U48. Data buffer 215 comprises U49 through U52.

Interface/DMA 20 is treated as an input/output (I/O) device by computer 50. The base address is switch selectable from 0000H to 0090H. In operation IOWC/ is buffered and decoded by address decode logic 213. The DMA block responds to each properly decoded address in its instruction set with an XACK/ to computer 50. Computer 50 responds to the XACK/ by releasing the IOWC/ and the DMA block is then in condition to operate on another IOWC/.

The instruction set for the DMA block comprises the following four I/O write commands.

(1) Reset Interrupt (RST INT)—The reset interrupt command is produced by address decode logic 213 in response to an IOWC/ to address 00'x '0H from computer 50 via multibus 90. No data is needed to produce a reset interrupt command.

(2) Transfer length load (XFER LNTH LD)—The transfer length load command is produced by address decode logic 213 in response to an IOWC/ at address 00'x '2H from computer 50 and is presented to both transfer length register 210 and address register 211. The transfer length load command causes the number of words to be transferred to be read into transfer length register 210.

(3) Starting Address Load (STADR LD)—The starting address load command is produced by address decode logic 213 in response to an IOWC/ at address 00'x'4H from computer 50. The starting address load command causes the high order 16 bits of the 20 bit starting address to be read into the address 00'x'4H. This address is then shifted left 4 bits so that all starting addresses will be on even 16 byte boundaries.

(4) Start Transfer (GO)—The start transfer command is produced by address decode logic 213 in response to an IOWC/ at address 00'x'6H. The start transfer command goes to timing logic 203 where an "enable" signal is produced which enables interface/—DMA 20. On the appropriate edge of the bus clock pulse, which is received by timing logic 203 from multibus 90, a BUSY/ signal is produced by timing logic 203 and interface/DMA 20 begins data transfer on the next vertical sync pulse from camera 10.

The interface block captures the four most significant bits of data from TV camera 10 and organizes them into 16 bit (2 byte) words. When a word has been formed a MWTC/ is sent to RAM memory 30 and data is transferred to memory 30 on multibus 90. Upon receiving an XACK/ from RAM memory 30, the interface removes the address and data from multibus 90, decrements transfer length register 210 and increments address register 211 twice. The interface also keeps track of how many "nibbles" (pixels) it has received from TV camera 10 in any horizontal line. At the end of each line the number of "nibbles" received from the camera is checked and, if necessary, extra transfers made to memory 30 so that words-out equals words-in for each line. In the preferred embodiment the interface block transfers a 16 bit word into RAM memory 30 in 180 nanoseconds. This includes all "housekeeping" functions on registers and timing functions required by multibus compatible circuits.

The rising edge of the vertical sync pulse, which occurs once each field, is taken as t=o. If an enable signal is presented by timing logic 203 at camera sync timing 204, then transfer begins. Four bits of data are loaded into one of the 4 by 4 registers comprising register file 202. As pointed out earlier, register file 202 comprises registers U7 through U10. The first "pixel" (four bits) is loaded, for example, in level 0 of register U7. The second, third and fourth pixels are loaded in level 0 of registers U8, U9 and U10, respectively. The fifth, sixth, seventh and eighth pixels are loaded in level 1 of registers U7, U8, U9 and U10, respectively. Read word logic 207 (counter U5) controls which word location will be loaded and is incremented after every fourth nibble (pixel).

When data transfer commences, the zero levels of registers U7, U8, U9 and U10 are read out in parallel to form the first 16 bit (2 byte) word. The second word is transferred by reading out in parallel level 1 from registers U7 through U10. The high data transfer rates are obtained by sequentially loading data into one level of registers U7 through U10 while simultaneously reading data out in parallel from another level of all four registers.

When the fourth nibble has been loaded into register file 202, a XFER REQ signal is generated within write timing logic 209 (U13, pin 5) and used to enable address bus driver 214. After a suitable delay, a MWTC/ is asserted on multibus 90 by write timing logic 209. When RAM memory 30 has accepted the data an XACK/ signal is asserted on the bus and decoded by write timing logic 209 which causes removal of the address and data from the bus as well as the MWTC/. Transfer length register 210 is decremented and address register 211 is bumped twice to conform with the word transfer mode of operation.

At the end of each horizontal line if there are no word left in register file 202, counters U5 and U6 of read/write equalization 206 will be equal. If the counters are unequal, successive transfers will be made until the counters are equal. At that point, no more transfers will be made for that line. Transfer of data will continue until a zero length signal is generated by transfer length register 210. At that time bus control is relinquished and the interface block disabled. Computer 50 issues a RST INT command and reclaims control of the bus.

Referring to FIG. 4, RAM memory 30 comprises control bus hardware 301, read/write buffers 302, memory array 303, address decode logic 304 and address block select jumpers 305. Memory array 303 preferably comprises a series of 64 "pages", each page having 16K 8-bytes of storage. Control bus hardware 301 synchronizes between the bus and memory array 303. Address decode logic 304 determines whether the address on the bus corresponds to one in memory array 303. Address block select jumpers 305 determine the base address for each page (16K byte block) of address space in memory array 303. Read/write buffers 302 buffer data between memory array 303 and the bus in response to an enable signal produced by address decode logic 304.

Referring briefly to FIG. 5, which is a schematic diagram of one "page" of RAM memory 30, U53 through U58 are read/write buffers whereas U2 through U9, U10 through U17, U20 through U27 and U28 through U35 comprise 32 Intel 2147-3 4K by 1 bit logic chips providing for 16K 8-bit bytes of storage.

Referring to FIG. 6, bus oriented processor 40 comprises microprocessor (CPU) 401 which is preferably an Intel 8086 16-bit microprocessor. Processor 40 also comprises clock generator 402, status decoder 403, address latch 404, bus arbiter 405, address bus driver 406, data bus driver 407, bus command decoder 408, interrupt jumpers 409, programmable interrupt controller (PIC) 410, remote I/O decoder 411, mailbox register file 412, interrupt control register 413, local I/O address decoder 414, memory address decoder 415, data buffer 416, high speed RAM memory 417 and high speed PROM memory 418.

Bus oriented processor 40 is itself a complete computer in the sense that it has an LSI microprocessor central processing unit, memory, interrupt priority resolution circuitry and bus arbitration. Processor 40 resides on the multibus and acts as an asynchronous computing resource. In multibus terminology, processor 40 is an intelligent slave. The configuration of processor 40 permits microprocessor 401 to operate on program code and data at its maximum computing speed. In addition computer 50, which in multibus terminology is a master module, can address processor 40 and download and/or up-load program code and/or data for asynchronous processing by bus oriented processor 40. The central component of processor 40 which permits this type of operation is the mailbox register file 412.

The implementation of a significant portion of the design of processor 40 is identical to the implementation of the Intel SBC 86/12 which, as previously noted, also employs an Intel 8086 16-bit microprocessor. Accordingly, only those areas will be described where there exist significant departures from standard design.

CPU 401 normally operates at an 8 megahertz clock frequency, although it can be made to operate at up to 10 megahertz. All timing functions operate at the full clock frequency without any "wait" states.

The memory of processor 40 has been organized into two separate address spaces. Addresses zero to 4095 comprise very high speed static random access memory 417 which may, for example, comprise Intel 2147-3 devices. Addresses 1,019,904 to 1,024,000 comprise high speed EPROM memory 418 which may, for example, comprise Intel 2716-1 devices. Memory address decoder 415 forces on board access for the two above-identified groups of addresses and forces bus access for all other addresses. Communication for initialization and normal operation of processor 40 is accomplished by means of dual ported mailbox register file 412 which responds to I/O commands, through jumper selectable addresses, from computer 50 as well as I/O commands from CPU 401. Thus, computer-to-computer communications are accomplished through mailbox register file 412 which may, for example, comprise four 74LS170 4 by 4 register files.

Programmed I/O is also decoded as on-board or off-board addresses. However, the on-board I/O device address are jumper selectable so as to avoid I/O address conflicts with other devices. Processor 40 comprises three I/O devices, viz: programmable interrupt controller 410; interrupt control register 413; and mailbox register file 412. Each I/O device is allocated a block of four addresses, each address being an even offset from a base address. For example, if the base address for programmable interrupt controller 410 were hexadecimal 40, then the succeeding addresses would be 42, 44, 46 and 48 in hexadecimal.

All I/O accesses not directed on-board are directed to the multibus. All bus oriented memory and I/O accesses are directed through "normal" bus arbitration. It should be noted, however, that CPU 401, may, under firmware control, "lock" the bus once it has completed arbitration and perform subsequent accesses without suffering any additional arbitration. This permits the fullest throughout performance to and from the bus, when necessary.

Processor 40 can also be made to operate as a slave processor. Under these conditions, upon initial power up and/or a hardware RESET, the firmware resident in processor 40 performs the initial configuration of programmable interrupt controller 410 and initialization of the memory, registers and stack pointer. The firmware then halts processor 40. Computer 50 on the multibus addresses mailbox register file 412 and loads a 16-bit vector into the mailbox register. Once the vector is loaded, an interrupt is generated to CPU 401. The firmware resident in processor 40 exits the HALT state and performs an I/O read to the mailbox register file. The 16-bit vector address is read and used as the most significant 16 bits in a 20-bit off-board memory address. This memory location is the first word in a processor control block (PCB). The firmware resident in processor 40 then accesses the PCB and reads and operates on processor control words (PCWs) contained within this PCB. The PCWs direct processor 40 to perform one of the following three functions:

(1) Send Status—form and place a processor status word (PSW) in a designated location in memory.

(2) Move Words—move words of program and/or data either from the memory of processor 40 to off-board memory (e.g., RAM memory 30) or vice versa.

(3) Execute—execute program code starting at a designated address.

The PCB contains a list of PCWs in a chain. Each PCW may be followed by appropriate data words. Once a PCW has been decoded and executed, an interrupt response will be sent, if so coded. The interrupt response is generated by interrupt control register 413. CPU 401 sets the appropriate interrupt level into interrupt control register 413 and this level is coupled to the multibus by means of an I/O write command to the interrupt control register.

This scheme of commanding processor 40 and utilizing the parallel interrupt mechanism permits high performance, asynchronous computation with a minimum of supervision and maximum flexibility. In operation, image processing algorithms are down-loaded into RAM memory 417 of processor 40. These algorithms are executed on "pixel" data stored in RAM memory 30 and provided to processor 40 via multibus 90. Thus, processor 40 performs high speed, asynchronous "array processing" of data stored in memory array 303 (FIG. 4).

The program flow charts for an application of the present invention to label inspection are shown in FIGS. 7A through 7H. First a master label is placed before TV camera 10. The output from the TV camera is then structured by interface/DMA 20 and stored in RAM memory 30. Next the master label is displayed on TV monitor 80 using graphics imaging circuitry 70. Alternatively, the master label could be displayed by a printer at operator control terminal 60. The particular inspection algorithm to be employed is then selected by the operator. The algorithm may, for example, involve an area calculation. Alternatively, the algorithm may involve a weighted line computation. The operator next sets the "window" (portion of the 244×236 array to be inspected) and "merit" (threshhold) to be employed for the particular inspection operation.

The system is now set to inspect labels on, for example, bottles as they come off a high speed fill line. As in the case of the master label, the subject label is imaged by TV camera 10 and the output from the TV camera is structured by interface/DMA 20 and stored in RAM memory 30. The window is selected and a high speed image processing routine employed using bus oriented processor 40. The routine selected may, for example, involve area or weighted line calculations. In both routines corresponding pixels from the master and subject labels stored in RAM memory 30 are selected and transferred to processor 40 where the absolute value of the difference in intensity is computed. From this value is subtracted the selected noise offset, which compensates for background interference.

In the case of the weighted line routine, the weighted differences are accumulated across a given line. The result of the accumulation is then compared with the "merit" or threshhold chosen for this window. If the accumulated result is greater than the merit, then an error is indicated. Assuming no error, successive lines of pixels are processed until the window has been completed at which time the system is ready to inspect the next subject label or the next window for this label.

In the case of the area routine, all non-zero differences for the whole window are accumulated and compared with the merit for the window. It will be appreciated that the merit for the area routine will normally be different from (greater than) the merit for the weighted line routine. If the accumulated differences for the window are greater than the merit for that window, an error is indicated. If not, the system is ready to process the next label or the next window for this label.

In both the area and weighted line routines the differences between corresponding pixels may be presented to an operator by a printer at terminal 60 or on TV monitor 80 so that, in the event of an error indication, the operator can see the cause of the error and, depending on its severity, accept or reject the label.

The invention disclosed and claimed herein is not limited to the preferred embodiment shown or to the exemplary application of that embodiment to label reading since modifications will undoubtedly occur to persons skilled in the art. Hence, departures may be made from the form of the present invention without departing from the principles thereof.

What we claim is:

1. A video inspection system comprising:
    (a) a TV camera for producing digitial video images of a subject;
    (b) an interface connected to said TV camera for structuring said digital data, said interface having a direct memory access channel;
    (c) a high speed random access memory connected to said interface by means of a multibus for storing said digital data;
    (d) a bus oriented processor connected to said interface and said memory by means of said multibus for performing high speed processing of the digital data stored in said random access memory;
    (e) a computer connected to said interface, said memory, and said processor by means of said multibus for controlling the operation of said system; and
    (f) a terminal connected to said computer for permitting an operator to communicate with said computer.

2. A video inspection system according to claim 1 wherein said TV camera comprises a two-axis array of picture elements, each picture element having at least sixteen levels of grey shade resolution.

3. A video inspection system according to claim 2 wherein said TV camera produces digital data at a rate of at least seven megabits per second.

4. A video inspection system according to claim 2 wherein said two-axis array comprises over fifty thousand picture elements.

5. A video inspection system according to claim 1 wherein said computer comprises a 16-bit microprocessor.

6. A video inspection system according to claim 1 wherein said terminal comprises an RS232C terminal.

7. A video inspection system according to claim 1 further comprising:
   (a) graphics imaging circuitry connected to said interface, said memory, said processor and said computer by means of said multibus; and
   (b) a TV monitor connected to said graphics imaging circuitry for displaying information produced by said video inspection system.

8. A video inspection system according to claim 1 wherein said random access memory comprises means for storing at least on the order of one million bytes of data.

9. A video inspection system according to claim 8 wherein said random access memory comprises a series of at least sixty pages and wherein each page comprises means for storing at least on the order of sixteen thousand 8-bit bytes.

10. A video inspection system according to claim 1 wherein said random access memory comprises:
    (a) a memory array comprising a series of pages;
    (b) control bus circuitry connected between said memory array and said multibus for synchronizing between said multibus and said memory array;
    (c) address decode logic connected between said memory array and said multibus for determining whether addresses on said bus correspond to addresses in said memory array;
    (d) address block select circuitry connected to said address decode logic for determining the address of each page in said memory array; and
    (e) read/write buffers connected between said memory array and said multibus, and to said address decode logic, for buffering data between said memory array and said bus in response to an enable signal produced by said address decode logic.

11. A video inspection system according to claim 10 wherein said memory array comprises means for storing at least o the order of one million bytes of data.

12. A video inspection system according to claims 10 or 11 wherein sad memory array comprises at least sixty pages and wherein each page comprises means for storing at least on the order of sixteen thousand 8-bit bytes.

13. A video inspection system according to claim 12 wherein each page comprises at least thirty-two 4 K by 1-bit logic elements.

14. A video inspection system according to claim 1 wherein said processor comprises a microprocessor central processing unit for performing data processing operations.

15. A video inspection system according to claim 14 wherein said microprocessor is a 16-bit microprocessor.

16. A video inspection system according to claim 14 wherein said processor further comprises memory, interrupt priority resolution circuitry and bus arbitration logic.

17. A video inspection system according to claim 16 wherein said processor memory comprises both very high speed static RAM memory and high speed PROM memory.

18. A video inspection system according to claim 16 wherein said processor further comprises a dual ported mailbox register file for temporarily storing data either after it has been received from said multibus or before it is placed on said multibus.

19. A video inspection system according to claim 18 wherein said mailbox register file comprises at least four 4 by 4 register files.

20. A system according to claims 16 or 18 further comprising a programmable interrupt controller for assigning priorities to interrupt signals received from said multibus and presenting them to said microprocessor.

21. A system according to claim 16 or 18 further comprising an interrupt control register for selectively presenting interrupt signals to said multibus.

22. A video inspection system according to claim 1 wherein said interface comprises means for transferring data to said random access memory at rates of on the order of ten million bytes per second.

23. A video inspection system according to claims 1 or 22 wherein said interface comprises means for capturing the four most significant bits of data of each picture element and for organizing said data into 16-bit words for transfer to said random access memory.

24. A video inspection system according to claim 23 wherein said means for organizing said data into 16-bit words comprises a first-in, first-out register file.

25. A video inspection system according to claim 24 wherein said register file comprises four registers, each register comprising four storage levels, each level comprising means for storing four bits.

26. A video inspection system according to claim 25 wherein said register file comprises means for reading successive 4-bit groups of data corresponding to successive picture elements into one level of successive ones of said four registers and for simultaneously reading a 16-bit word from another level of all four registers.

27. A video inspection system according to claim 23 wherein said interface comprises means for monitoring how many digital picture elements have been received from said camera in any horizontal line and how many of those picture elements have been transferred to said random access memory.

28. A video inspection system according to claim 27 wherein said interface further comprises means for ensuring that the number of picture elements received from said camera corresponds to the number of picture elements transmitted to said memory, for each horizontal line.

29. A video inspection system comprising:
   (a) a TV camera for producing digital video images of a subject, said TV camera comprising a two-axis array of picture elements, each picture element having at least sixteen levels of grey shade resolution;
   (b) an interface connected to said TV camera for capturing and structuring the four most significant bits of data corresponding to each picture element, said interface having a direct memory access channel;
   (c) a high speed random access memory connected to said interface by means of a multibus arrangement, said random access memory comprising a memory array comprising a series of pages for storing said digital data;
   (d) a bus oriented processor connected to said interface and said random access memory by means of said multibus for performing high speed processing of said digital data stored in said memory array;

(e) a computer connected to said interface, said random access memory and said processor by means of said multibus for controlling the operation of said system; and (f) a terminal connected to said computer and adapted to permit an operator to communicate with said computer.

30. A video inspection system according to claim 29 wherein said two-axis array comprises over fifty thousand picture elements and wherein said TV camera produces digital data at a rate of at least seven megabits per second.

31. A video inspection system according to claim 30 wherein said interface comprises means for transferring data to said random access memory at rates of on the order of ten million 8-bit bytes per second.

32. A video inspection system according to claim 29 or 30 wherein said memory array comprises at least sixty pages and wherein each page comprises means for storing sixteen thousand 8-bit bytes.

33. A video inspection system according to claim 29 wherein said random access memory comprises:
(a) control bus circuitry connected between said memory array and said multibus for synchronizing between said multibus and said memory array;
(b) address decode logic connected between said memory array and said multibus for determining whether addresses on said bus correspond to addresses in said memory array;
(c) address block select circuitry connected to said address decode logic for determining the address of each page in said memory array; and
(d) read/write buffers connected between said memory array and said multibus, and to said address decode logic, for buffering data between said memory array and said bus in response to an enable signal produced by said address deocode logic.

34. A video inspection system according to claim 29 wherein said computer comprises a 16-bit microprocessor and wherein said terminal comprises an RS232C terminal.

35. A video inspection system according to claim 29 further comprising:
(a) graphics imaging circuitry connected to said interface, said random access memory, said processor and said computer by means of said multibus; and
(b) a TV monitor connected to said graphics imaging circuitry for displaying information produced by said video inspection system.

36. A video inspection system according to claim 29 wherein said processor comprises a microprocessor central processing unit for performing data processing operations, a memory, interrupt priority resolution circuitry and bus arbitration logic.

37. A video inspection system according to claim 36 wherein said processor comprises:
(a) a dual ported mailbox register file for temporarily storing data either after it has been received from said multibus or before it is placed on said multibus;
(b) a programmable interrupt controller for assigning priorities to interrupt signals received from said multibus and presenting them to said microprocessor in an orderly manner; and
(c) an interrupt control register for selectively presenting interrupt signals to said multibus.

38. A video inspection system according to claim 29 wherein said means for capturing and structuring said digital data comprises a first-in, first-out register file comprising four registers, each register comprising four storage levels, each level comprising means for storing four bits.

39. A video inspection system according to claim 38 wherein said register file comprises means for reading successive 4-bit groups of data corresponding to successive picture elements into one level of successive ones of said four registers and for simultaneously reading a 16-bit word from another level of all four registers.

40. A video inspection system according to claim 29 wherein said interface comprises means for monitoring how many digital picture elements have been received from said camera in any horizontal line and how many of those picture elements have been transferred to said random access memory and for ensuring that the number of picture elements received from said camera corresponds to the number of picture elements transmitted to said memory, for each horizontal line.

41. A video inspection method comprising the steps of:
(a) imaging a master on a TV camera having a two-axis array of picture elements;
(b) producing a digital video representation of said master;
(c) capturing and structuring said digital video representation of said master;
(d) transferring said digital representation of said master to a memory;
(e) storing said digital representation of said master in said memory;
(f) selecting an inspection algorithm to be employed in the inspection operation;
(g) selecting a window to be inspected;
(h) selecting a threshold for the window selected;
(i) imaging a subject on said camera;
(j) producing a digital video representation of said subject;
(k) capturing and structuring said digital video representation of said subject;
(l) transferring said digital representation of said subject to said memory;
(m) storing said digital representation of said subject in said memory;
(n) comparing corresponding picture elements for said master and subject within the selected window; and
(o) determining whether the result of the comparison exceeds the selected threshold.

42. A video inspection method according to claim 41 including the additional steps of:
(a) displaying an image of said master; and
(b) displaying an image of said subject.

43. A video inspection method according to claim 42 including the additional step of displaying any difference between said master and said subject.

44. A video inspection method according to claim 41 including the additional step of setting an alarm if the result of the comparison exceeds the selected threshold.

45. A video inspection method according to claim 41 wherein the determination whether the threshold has been exceeded occurs at the end of each horizontal line within the selected window.

46. A video inspection method according to claim 41 wherein the determination whether the threshold has been exceeded occurs after inspection of the selected window has been completed.

47. A video inspection method according to any of claims 41, 42, 43, 44, 45 or 46 wherein each picture element has at least sixteen levels of grey shade resolution.

48. A video inspection method according to claim 47 wherein said digital video representation is produced at a rate of at least seven megabits per second.

49. A video inspection method according to claim 48 wherein transfer of said digital representation occurs at rates of on the order of ten million 8-bit bytes per second.

50. A video inspection method according to claim 47 wherein said two-axis array comprises at least fifty thousand picture elements.

51. A video inspection method according to claim 47 wherein said step of capturing and structuring said digital video representation comprises the steps of:
   (a) successively reading 4-bit groups of data corresponding to successive picture elements into one level of four registers; and
   (b) simultaneously reading a 16-bit word from another level of all four registers.

52. A video inspection method according to claim 41 wherein said step of capturing and structuring said digital video representation comprises the steps of:
   (a) successively reading 4-bit groups of data corresponding to successive picture elements into one level of four registers; and
   (b) simultaneously reading a 16-bit word from another level of all four registers.

53. A video inspection method according to claim 41 wherein said step of transferring said digital representation includes the step of ensuring that, for each horizontal line, the number of digital picture elements received from said camera equals the number of picture elements transferred to said memory.

54. A video label inspection method comprising the steps of:
   (a) imaging a master label on a TV camera having a two-axis array of picture elements, each picture element comprising sixteen levels of gray shade resolution;
   (b) producing a digital video representation of said master label;
   (c) capturing and structuring said digital video representation of said master label;
   (d) transferring said digital representation of said master label to a memory;
   (e) storing said digital representation of said master label in said memory;
   (f) selecting an inspection algorithm to be employed for label inspection;
   (g) selecting a window to be inspected;
   (h) selecting a threshold for the window selected;
   (i) imaging a subject label on said camera;
   (j) producing a digital video representation of said subject label;
   (k) capturing and structuring said digital video representation of said subject label;
   (l) transferring said digital representation of said subject label to said memory;
   (m) storing said digital representation of said subject label in said memory;
   (n) comparing corresponding picture elements for said master and subject labels within the selected window; and
   (o) determining whether the result of the comparison exceeds the selected threshold.

55. A video label inspection method according to claim 54 including the additional step of:
   (a) displaying an image of said master label; and
   (b) displaying an image of said subject label.

56. A video label inspection method according to claim 55 including the additional step of displaying any difference between said master label and said subject label.

57. A video label inspection method according to claim 55 wherein the determination whether the threshold has been exceeded occurs at the end of each horizontal line within the selected window.

58. A video label inspection method according to claim 55 wherein the determination whether the threshold has been exceeded occurs after inspection of the selected window has been completed.

59. A video label inspection method according to claim 54 including the additional step of setting an alarm if the result of the comparison exceeds the selected threshhold.

60. A video inspection method according to claims 41 or 54 wherein said step of comparing corresponding picture elements comprises the step of determining the absolute value of the difference in intensity for each pair of picture elements within the selected window.

61. The video inspection method of claim 60 comprising the further step of subtracting from the absolute value the selected noise offset.

* * * * *